April 6, 1948.  J. NASH  2,439,346
PARALLEL RULER AND METHOD OF MAKING THE SAME
Filed Sept. 2, 1944
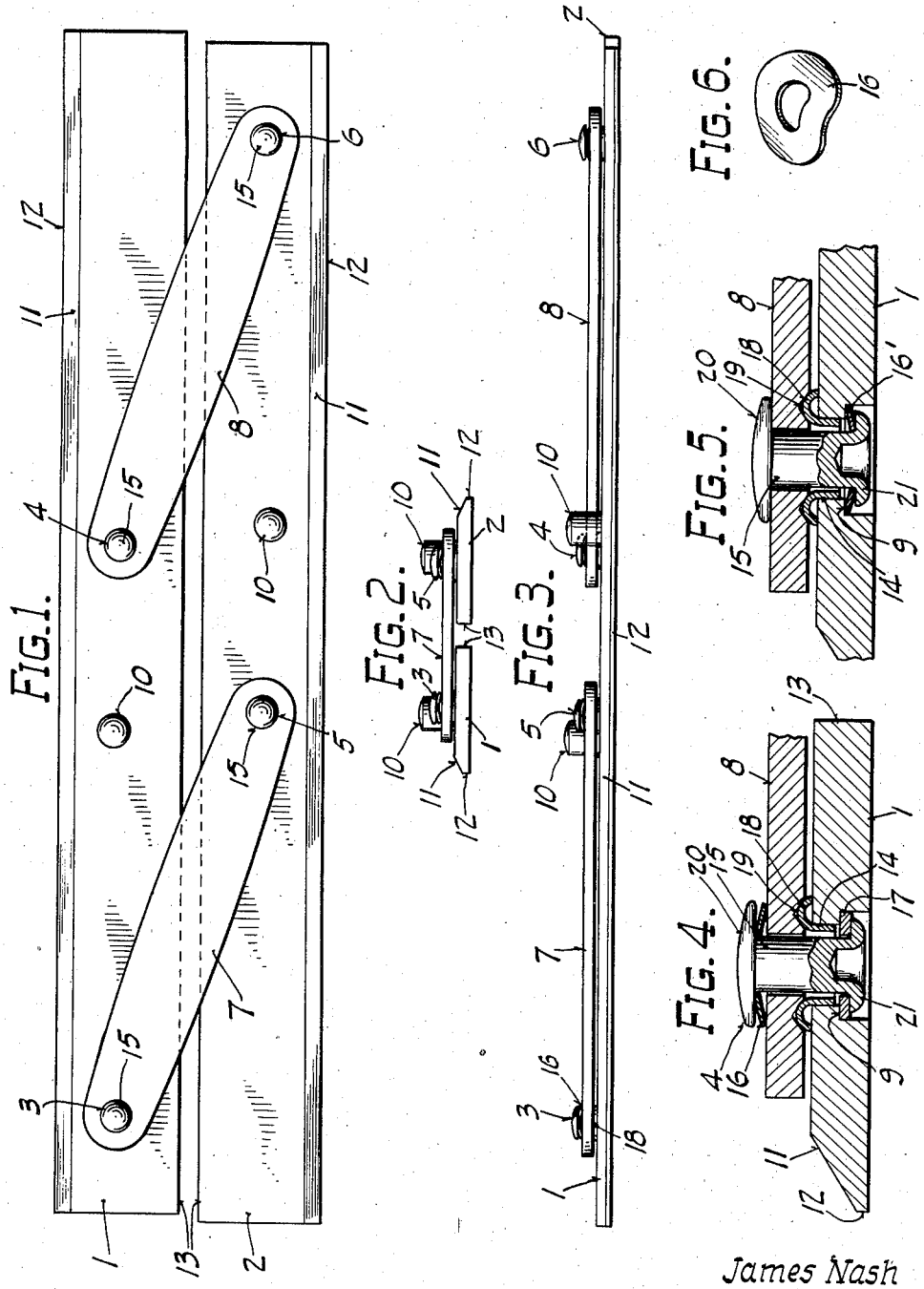
James Nash
INVENTOR.
BY
ATTORNEY.

Patented Apr. 6, 1948

2,439,346

UNITED STATES PATENT OFFICE 2,439,346

PARALLEL RULER AND METHOD OF MAKING THE SAME

James Nash, Milwaukee, Wis., assignor to Eclipse Moulded Products Company, Milwaukee, Wis., a corporation of Wisconsin Application September 2, 1944, Serial No. 552,427

7 Claims. (Cl. 33—108)

This invention relates to parallel rulers and method of making the same.

One object of the present invention is to provide a parallel ruler which has the blades and links molded to the proper shape and dimensions to eliminate costly machining thereof.

Another object is to provide a parallel ruler in which the blades and links are molded with apertures to receive the pivotal connections.

Another object of the invention is to provide an inexpensive method of making a parallel ruler.

Another object is to provide a parallel ruler with pivotal connections that maintain the level position of the links and prevent radial movement of each link.

A further object is to provide a parallel ruler having freely floating links and blades without loss of accuracy.

Another object is to provide a resilient connection between the links and blades.

Another object is to provide a parallel ruler with pivotal connections that are fabricated from standard parts readily provided and of low cost.

Another object is to provide pivotal connections between links and blades that self compensate for wear.

Another object is to provide a parallel ruler with pivotal connections in which the rivet or the like merely serves to hold the links and blades together and not as a bearing member.

These and other objects of the invention appear hereinafter in connection with the description of several embodiments of the invention illustrated in the accompanying drawings.

In the drawings:

Figure 1 is a top plan view of a parallel ruler embodying the features of the invention;

Fig. 2 is an end view of the ruler;

Fig. 3 is a longitudinal side elevation of the ruler;

Fig. 4 is a detail enlarged section taken through one of the pivotal connections between a link and blade and illustrating a joint that may be employed;

Fig. 5 is a section similar to Fig. 4 and illustrating another form of pivotal connection that may be utilized between a link and blade; and Fig. 6 is a perspective view of the U bent spring washer employed in each embodiment.

The parallel ruler of the invention comprises in general a pair of straight edge blades 1 and 2 of the same shape and dimensions having pivotal connections 3 and 4, and 5 and 6 respectively, and joined together by a pair of links 7 and 8 of equal length with link 7 extending from connection 3 of blade 1 to connection 5 of blade 2 and link 8 extending from connection 4 of blade 1 to connection 6 of blade 2.

Both the blades and links are molded to the desired dimensions and shape from suitable plastic material in order to eliminate extensive machining operations and provide an inexpensive method of fabrication.

In the molding of blades 1 and 2 holes or apertures are provided in blade 1 at pivotal connections 3 and 4 and similar holes or apertures are provided in blade 2 at pivotal connections 5 and 6. The holes are enlarged in substantially the lower half of the blades to provided each hole with shoulder 9 at substantially the center of the blade thickness.

Also in the molding of the blades knobs 10 are molded integral with the upper surface thereof at suitable locations to facilitate manipulation of the blades.

The outer longitudinal working edge 11 of each blade 1 and 2 is molded to slope downwardly from to top surface thereof to a straight vertical face portion 12 near the bottom surface of each blade to provide a good working edge. The inner edge 13 is molded with a straight vertical face so that the ruler may be readily closed with the blades disposed back to back. The outer vertical edges are also straight and after molding none of the edges need be machined.

The molding of links 7 and 8 is accomplished in much the same manner as the folding of blades 1 and 2 and each link is provided with a hole or aperture at the pivotal connection area to be concentrically aligned with the holes in the blades upon assembly together.

After the molding operations have been completed links 7 and 8 and blades 1 and 2 are cleaned of molding flash to make them ready for assembly. No machining operations need be performed, except that it may be desirable to ream out the hole at pivotal connection 6 in blade 2 to align the hole with that at pivotal connection 5 and accurately space the same therefrom, and to insure that the distance between pivotal connections 5 and 6 of blade 2 is equal to the distance between pivotal connections 3 and 4 of blade 1.

The pivotal connections that may be employed to resiliently join and circumferentially interlock the links and blades together are illustrated in Figs. 4 and 5 of the drawings. Since all the connections are similar it is only necessary to refer to connection 4 for purposes of description.

In the embodiment of the invention illustrated in Fig. 4, pivotal connection 4, in general, comprises a bearing member or grommet 14 to separate the blade and link upon assembly together and prevent lateral movement of the link, a rivet 15 to hold the link and blade together and a resilient washer 16 to maintain the grommet in place. Where the resilient washer 16 is located as shown in Fig. 4, between the rivet head and the top of the link, an additional washer 17 is employed to bear against shoulder 9 to provide a surface against which the lower end of rivet 15 may be flared and to maintain the rivet axially centered.

Grommet 14 is preferably assembled in the hole of pivotal connection 4 of blade 1 and tightly hugs the wall of the hole in the area above shoulder 9. The upper head 18 of the grommet is outwardly curved to rest on the top surface of blade 1 encircling the pivotal connection hole.

The head 18 of grommet 14 separates blade 1 from link 8 when the latter is assembled therewith and is curved in cross section to seat in the annular groove 19 extending around the hole of connection 4 on the bottom surface of link 8.

Groove 19 is formed after the molding of link 8, preferably by a hot die pressing operation, and has tapered side walls for engaging and centering the curved head 18 of the grommet. Link 8 rides on the curved head of grommet 14 and at no time contacts blade 1. The receiving of grommet or circular bearing seat 14 in circular groove 19 prevents lateral offset of the link and blade relative to the axis of the pivotal connection.

Rivet 15, joining the blade and link together, is of standard shape obtainable in the commercial market and has a flanged head 20 which overlies the top surface of link 8. A resilient U bent metal washer 16 is disposed beneath head 20 and separates the head from the link.

The stem or shank of rivet 15 passes through the pivotal connection hole of link 8 and grommet 14 disposed in the pivotal connection hole of blade 1.

The lower end of rivet 15 is hollow to provide a rim 21 which, after assembly of the parts, is flared radially outward and up against the washer 17.

The rivet shank is preferably loose in both the link 8 and grommet 14 but should fit tightly in washer 17.

The washer 17 fits tightly against shoulder 9 and substantially centers the rivet in the hole. This construction avoids any interference with the pivotal action of link 8 by the rivet and provides that the rivet merely secures the parts together axially of the connection.

In assembling a pivotal connection such as pivotal connection 4, grommet 14 is disposed in the hole of blade 1 with the head of the grommet overlapping the top surface of the blade. Spring washer 16 is then slipped over the stem of rivet 15 into contact with head 20 and the rivet is inserted in the aligned pivotal connection holes of connection 4 radially spaced from the walls of link 8 and blade 1.

Washer 17 is next slipped over the end of the rivet stem projecting from the bottom of blade 1 until it abuts against shoulder 9 of the blade. The washer has sufficient radial extent to bear against the surface of shoulder 9.

The rim 21 of rivet 15 is then flared outwardly and upwardly against washer 17 to hold or clinch the assembly securely in place. The flared end of the rivet holds washer 17 tightly against shoulder 9. This completes the assembly.

Lateral movement of link 8 relative to blade 1 is prevented by grommet 14 disposed in groove 19, and which provides a bearing for the link to rotate thereon. The spring washer 16 beneath head 20 of rivet 15 keeps the grommet seated in the groove. The level of the link is thus always maintained above the blades and the link floats freely with respect to the rivet which at no time serves as a bearing therefor.

In another embodiment of the invention illustrated in Fig. 5, washer 17 of the embodiment of Fig. 4 is eliminated and the spring washer 16' of Fig. 4 is substituted therefor. The remaining parts of the pivotal connection are preferably the same as in Fig. 4. The transfer of washer 16' to the former location of washer 17 reduces the number of parts and makes it possible to employ a shorter rivet.

The invention provides an accurate and effective parallel ruler that is inexpensive to manufacture, due to the method of fabrication by molding and through the utilization of pivotal connections which are provided by inexpensive standard parts.

The lateral interlock between the blades and links at each pivotal connection maintains the blades in accurate parallel relation at all times.

Various embodiments of the invention may be employed within the scope of the accompanying claims.

I claim:

1. In a parallel ruler having a pair of blade members and link members, a pivotal connection between each blade and link comprising, a rivet member loosely extending within the concentrically aligned holes of a link and blade, means disposed between the blade and link members to separate the same and provide a bearing for one of said members, and resilient means confined at one end of said rivet member to maintain the respective blade or link member to maintain the respective blade or link member seated on said bearing means and radially spaced from said rivet member.

2. In a parallel ruler having a pair of blade members and link members, a pivotal connection between each blade and link comprising, a rivet member loosely extending within the concentrically aligned holes of a link and blade, a bearing member disposed between the blade and link member to separate the same, said bearing member encircling the rivet member and having one end seated in an annular groove in the bottom surface of the link around the pivotal hole therethrough to provide a bearing for said link, and resilient means confined at one end of said rivet member to maintain the seating of the bearing member in the groove in said link.

3. A parallel ruler comprising a pair of blade members, link members joining said blade members, said members having accurately spaced holes for receiving pivotal connections therefor with each pivotal connection comprising a rivet disposed loosely in the aligned holes for each pivotal connection to secure the parts axially together, a circular bearing seat secured in one of said members and adapted to space the other member axially therefrom for free pivoting relative thereto, and a circular groove in said other member for receiving said bearing seat and preventing lateral offsetting of said member relative to the axis of the pivotal connection.

4. A parallel ruler comprising a pair of blade members and link members with spaced holes to receive pivotal connections joining the blades and links together, each of said pivotal connections comprising respectively a rivet member disposed within the concentrically aligned holes of a blade and link member and radially spaced from the walls of said members, a grommet disposed between the blade and link to separate the same, said grommet encircling said rivet within the blade member and being seated at the upper end thereof in an annular groove in the bottom surface of the link around the hole therethrough to provide a bearing for said link, and resilient means confined at one end of the rivet to maintain the seating of the grommet in said groove and prevent lateral movement of said link.

5. A parallel ruler comprising a pair of blade members and link members with spaced holes to receive pivotal connections therefor with each connection comprising a rivet disposed within the concentrically aligned holes of a blade and link member and axially spaced from the walls of said members, a grommet disposed between the blade and link to separate the same, said grommet encircling said rivet within said blade and being seated at the upper end thereof in an annular groove in the bottom surface of the link around the hole therethrough to provide a bearing for said link, a resilient member encircling the upper end of the rivet above the link to maintain the seating of the grommet in said groove, and a washer encircling the lower end of the grommet, the lower end of said rivet being flared upwardly against said washer to secure the parts together.

6. The method of making a parallel ruler which comprises providing a pair of blade members and a pair of link members for joining said blade members in parallel relation, pivotally connecting the respective members in vertically spaced relation with the links mounted above the blades, and laterally interlocking the links and blades at each pivotal connection to prevent lateral displacement of one member relative to another and maintain the blades in accurate parallel relation at all times.

7. A parallel ruler comprising a pair of blade members and link members, respectively, pivotal connections joining the link members and blade members, a centering interlock spacing the links axially from the blades at the corresponding pivotal connections and preventing lateral offset of the links and blades relative to the axis of the pivotal connections, a rivet passing through said centering interlock and adjacent members to secure the same together, and resilient means confined around each pivotal connection to maintain the centering interlock between the blades and links.

JAMES NASH.

REFERENCES CITED

The following references are of record in the file of this patent:

UNITED STATES PATENTS

| Number | Name | Date |
|---|---|---|
| 791,251 | Cumming | May 30, 1905 |
| 1,455,708 | Brown | May 15, 1923 |
| 1,746,537 | Knechtel | Feb. 11, 1930 |
| 2,161,236 | Shaw | June 6, 1939 |
| 2,182,028 | Little | Dec. 5, 1939 |
| 2,365,735 | Ware | Nov. 7, 1942 |
| 2,405,897 | Milone | Aug. 13, 1946 |

Certificate of Correction

Patent No. 2,439,346.

April 6, 1948.

JAMES NASH

It is hereby certified that errors appear in the printed specification of the above numbered patent requiring correction as follows: Column 2, line 32, for the word "folding" read *molding*; column 4, lines 39 and 40, claim 1, strike out "to maintain the respective blade or link member"; line 55, claim 2, for the word "hearing" read *bearing*; and that the said Letters Patent should be read with these corrections therein that the same may conform to the record of the case in the Patent Office.

Signed and sealed this 1st day of June, A. D. 1948.

[SEAL]

THOMAS F. MURPHY,
*Assistant Commissioner of Patents.*